(12) United States Patent
Zehrer

(10) Patent No.: US 7,503,705 B2
(45) Date of Patent: *Mar. 17, 2009

(54) OPTICAL TRANSMISSION LINE RETENTION AND LIGHT ACCUMULATION BUSHING

(75) Inventor: Matthew C. Zehrer, St. Paul, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/201,187

(22) Filed: Aug. 29, 2008

(65) Prior Publication Data

US 2008/0310813 A1    Dec. 18, 2008

Related U.S. Application Data

(63) Continuation of application No. 11/554,870, filed on Oct. 31, 2006, now Pat. No. 7,445,391.

(51) Int. Cl.
G02B 6/36 (2006.01)
G02B 6/42 (2006.01)
H01S 3/00 (2006.01)

(52) U.S. Cl. .................... 385/88; 385/76; 385/138; 385/139; 372/108

(58) Field of Classification Search ............. 385/76–94, 385/138
See application file for complete search history.

(56) References Cited

U.S. PATENT DOCUMENTS

| | | | | |
|---|---|---|---|---|
| 5,548,676 A * | 8/1996 | Savage, Jr. | ................... | 385/92 |
| 5,761,359 A * | 6/1998 | Chudoba et al. | .............. | 385/78 |
| 5,825,954 A * | 10/1998 | Dunn et al. | ................... | 385/79 |
| 6,526,201 B1 * | 2/2003 | Mrakovich et al. | ............ | 385/33 |
| 7,305,159 B1 * | 12/2007 | Cummings et al. | ............ | 385/31 |
| 2004/0120153 A1 * | 6/2004 | Pate | .......................... | 362/296 |
| 2004/0218656 A1 * | 11/2004 | Wang et al. | .................. | 372/108 |

* cited by examiner

Primary Examiner—Michelle R Connelly Cushwa
(74) Attorney, Agent, or Firm—Cantor Colburn LLP

(57) ABSTRACT

Disclosed is an electronic component which includes a removable planar card having a light emitting diode (LED). The electronic component also includes an attachment flange having a first face and a second face substantially parallel to a removable planar card face, and a bushing installed in a hole in the attachment flange. The bushing includes an inner member having a head, a threaded shaft extending from the head. The inner member is inserted through the flange hole such that the head rests on the flange first face. The bushing also includes a sleeve having an threaded inner diameter that is threaded onto the shaft such that the attachment flange is clamped between the inner member and the sleeve and a bottom end of the sleeve is suspended over the LED. Finally, the electronic component includes an optical transmission line inserted into a through hole in the inner member.

2 Claims, 4 Drawing Sheets

OPTICAL TRANSMISSION LINE RETENTION AND LIGHT ACCUMULATION BUSHING

CROSS-REFERENCE TO RELATED APPLICATION

This application is a continuation of U.S. patent application Ser. No. 11/554,870, filed Oct. 31, 2006, the disclosure of which is incorporated by reference herein in its entirety.

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to light emitting diode (LED) light transmission, and particularly to an apparatus for securing an end of an optical transmission line.

2. Description of Background

Optical transmission lines are used in electronic devices, often to transmit light from a light emitting diode (LED) on a planar card to a display. Typically, the optical transmission line is secured to the LED by a mechanical connection to the LED and/or the planar card. The optical transmission line is connected in this manner to help ensure proper positioning of the optical transmission line relative to the LED and thus ensure that the light transmission to the display is effective.

The above configuration is not optimal, however, because the optical transmission line is mechanically connected to the planar card. When a planar card is removed from the electronic device, the removal is time consuming because the optical transmission line must first be disconnected from the planar card. Furthermore, damage to the planar card and/or the optical transmission line can occur if planar card removal is attempted without disconnecting the optical transmission line.

What is needed is an apparatus for securing and positioning the optical transmission line that does not require the optical transmission line to be connected to a removable planar card containing the LED.

SUMMARY OF THE INVENTION

The shortcomings of the prior art are overcome and additional advantages are provided through the provision of a bushing for an optical transmission line which includes an inner member having a head, a threaded shaft extending from the head, and a through hole along an axis of the inner member, which is configured to receive an optical transmission line. The bushing also includes a sleeve having an inner diameter which is threaded and receivable of the threaded shaft.

An electronic component is also provided which includes a removable planar card having a light emitting diode (LED). The electronic component also includes an attachment flange having a first face and a second face substantially parallel to a removable planar card face, and a bushing installed in a hole in the attachment flange. The bushing includes an inner member having a head, a threaded shaft extending from the head, and a through hole along an axis of the inner member, which is configured to receive an optical transmission line. The inner member is inserted through the flange hole such that the head rests on the flange first face. The bushing also includes a sleeve having an inner diameter which is threaded and receivable of the threaded shaft. The sleeve threaded onto the shaft such that the attachment flange is clamped between the inner member and the sleeve and a bottom end of the sleeve is suspended over the LED. Finally, the electronic component includes an optical transmission line inserted into the inner member through hole.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which secures an optical transmission line for effective light transmission in an electronic device, without the optical transmission line being connected to a removable planar card containing the LED source.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
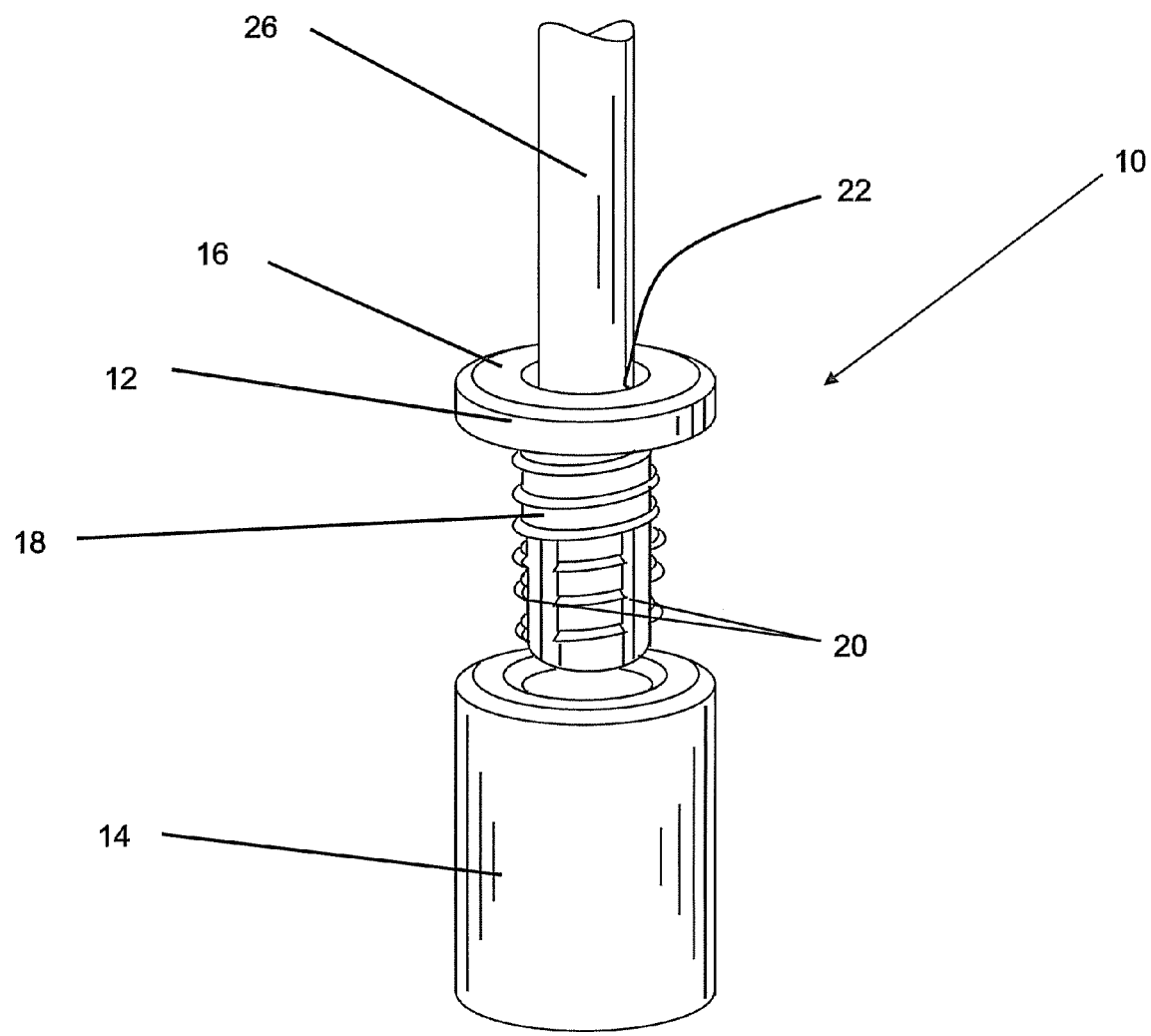
FIG. 1 illustrates a perspective view of one example of an optical transmission line bushing.

Turning now to the drawings in greater detail, it will be seen that in FIG. 1 there is an optical line retention bushing 10. The retention bushing 10 comprises an inner member 12 and a sleeve 14. The inner member 12 includes a head 16 and a shaft 18 extending from the head 16. The shaft 18 is threaded on an outer surface of the inner member 12. The inner member 12 has a through hole 22 extending through the head 16 and the shaft 18. The through hole 22 is sized and configured to receive an optical transmission line 26 of a desired size. The shaft 18 may also include one or more relief slits 20 disposed around a circumference of the shaft 18 to increase flexibility of the shaft 18, and to prevent failure of the shaft 18 when an optical transmission line 26 is inserted into the shaft 18. The sleeve 14 has a substantially tubular shape. As shown in FIG.

Figure 3:
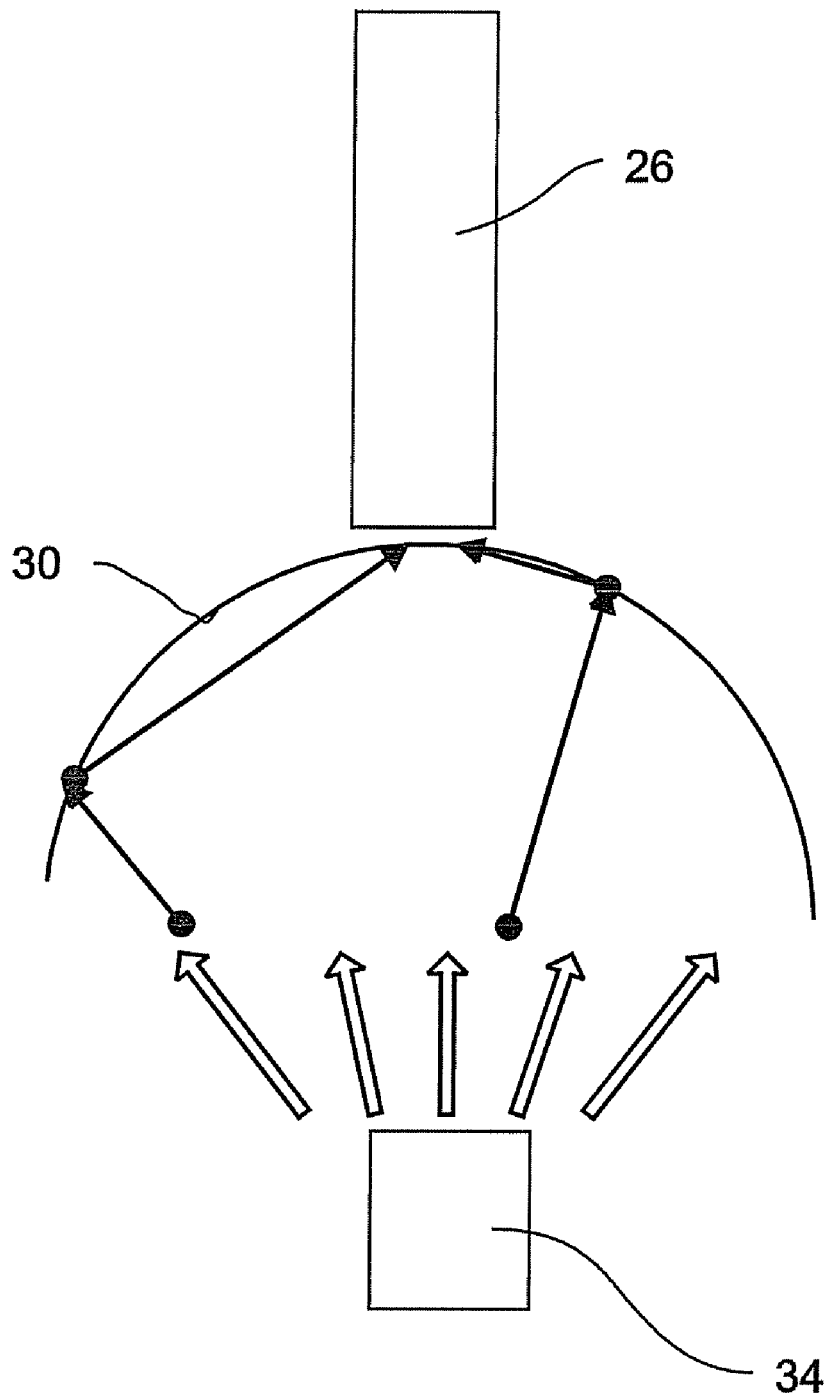
FIG. 3 illustrates a schematic view of a concave chamber in a sleeve forcing light from an LED into the optical transmission line.

2, the sleeve 14 has an inner diameter 28 that is threaded such that the shaft 18 is receivable into the inner diameter 28. The sleeve 14 may also include a concave chamber 30 that extends into the sleeve 14 at a bottom end 32 of the sleeve 14. As shown in FIG. 3, when placed over a light emitting diode 34, the concave chamber 30 increases the amount of light forced into the optical transmission line 26, thereby making the transmission more effective.

Figure 2:
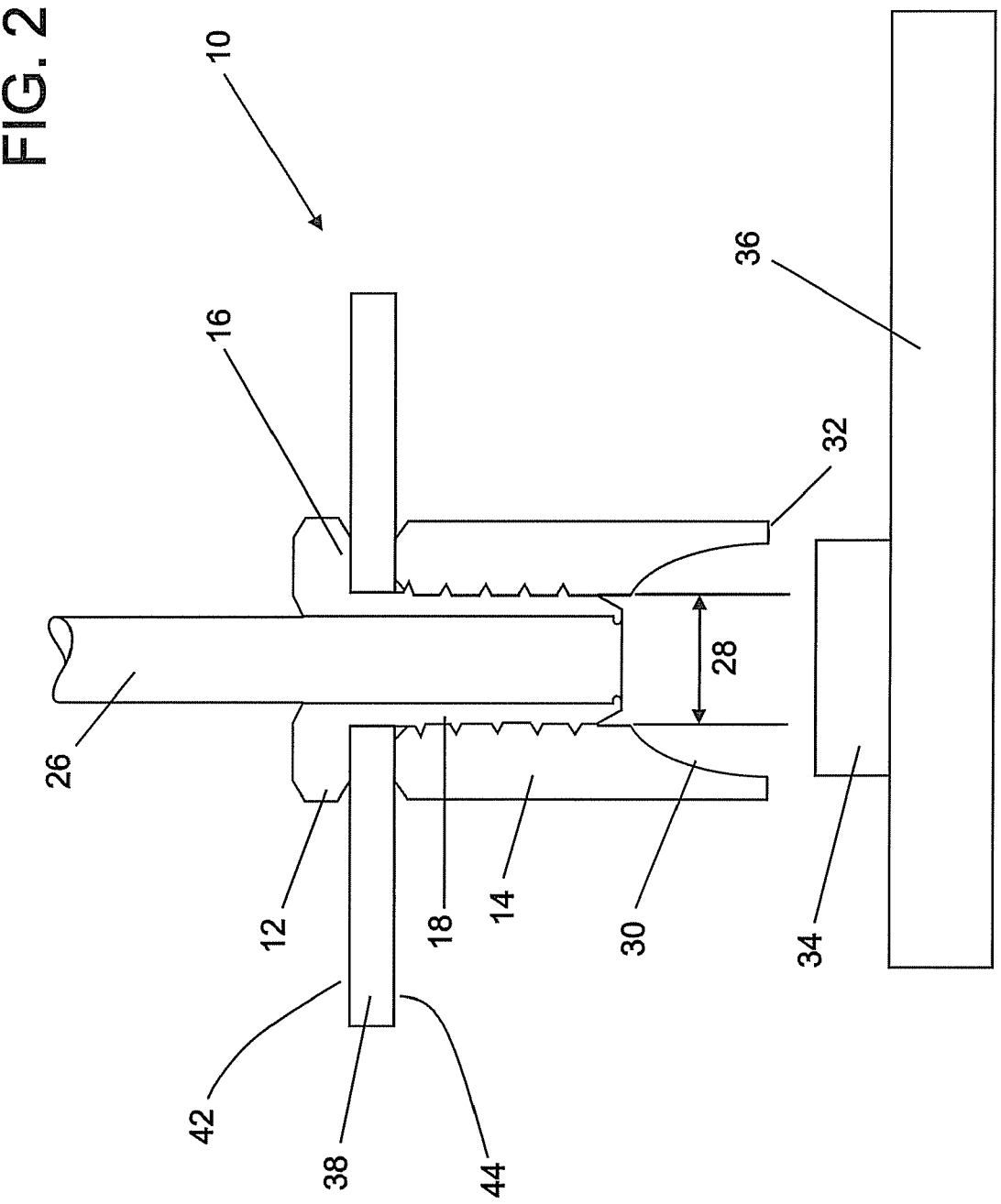
FIG. 2 illustrates a cross-section view of an example of an electronic component including the optical transmission line bushing of FIG. 1.
Figure 4:
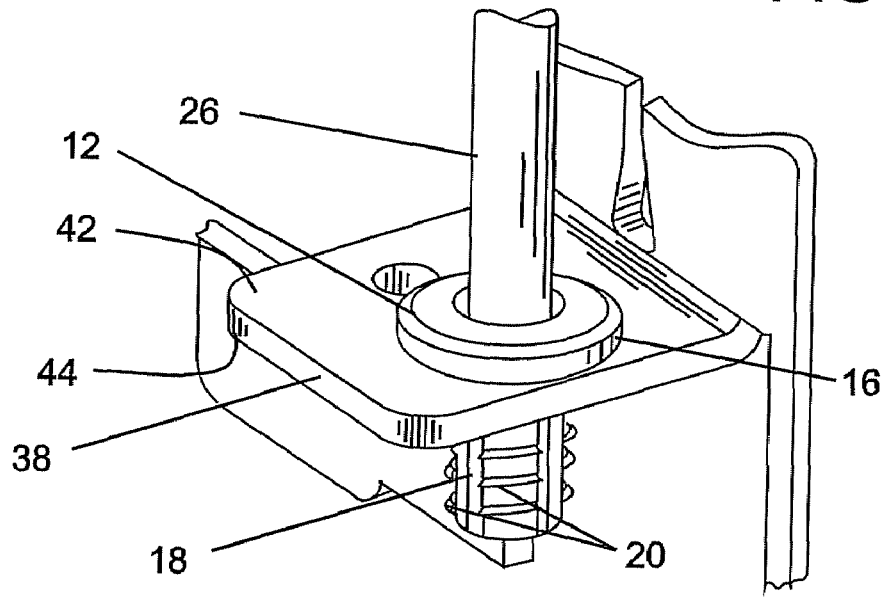
FIG. 4 illustrates a perspective view of an inner member of the optical line transmission bushing of FIG. 1 installed through a flange.
Figure 5:
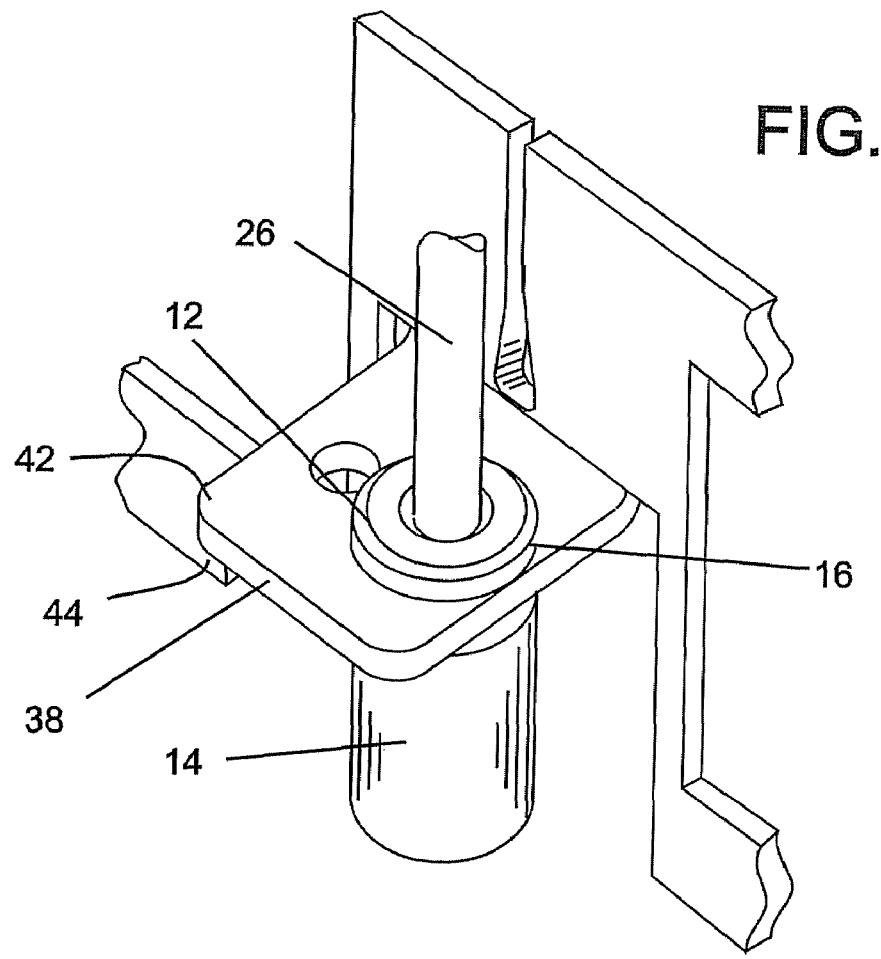
FIG. 5 illustrates a perspective view of a sleeve of an optical line transmission bushing of FIG. 4 secured over a threaded shaft of the inner member.

Returning again to FIG. 2, the bushing 10 is utilized to fix an end of the optical transmission line 26 of an electronic component (not shown) in an optimal position relative to a light emitting diode (LED) 34, which is disposed on a removable planar card 36. A fixed attachment flange 38 containing a flange hole 40 is disposed in a position over the LED 34, such that a top face 42 and a bottom face 44 of the flange 38 is substantially parallel to the removable planar card 36. As shown in FIG. 4, the optical transmission line 26 is inserted into the inner member 12, which is then inserted through the flange hole 40 so the head 16 rests on the top face 42 and the shaft 18 protrudes from the bottom face 44. As shown in FIG. 5, the sleeve 14 is thereafter threaded onto the shaft 18. Returning to FIG. 2, the sleeve 14 is threaded onto the shaft 18 such that the concave chamber 30 is proximate to the LED 34. When the sleeve 14 is threaded onto the shaft 18, the head 16 and the sleeve 14 clamp the flange 38 between the head 16 and the sleeve 14, thus fixing the position of the bushing 10 and the optical transmission line 26 contained therein. The bushing 10 and the optical transmission line 26 are thus suspended over the LED 34. Light emitted by the LED 34 is collected by the concave chamber 30 and forced into the optical transmission line 26. The light is then transmitted to the desired output such as, for example, a bezel. Positioning the optical transmission line 26 using the bushing 10 allows the removal and replacement of the removable planar card 36 to be achieved more easily because the optical transmission line 26 is not connected to the removable planar card 36.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. An electronic system comprising:
    a removable planar card, the removable planar card including a light emitting diode (LED) disposed on a surface thereof;
    an attachment flange having a first face and a second face, the second face of the attachment flange substantially parallel to the surface of the removable planar card, the attachment flange having a through flange hole;
    a bushing installed at the flange hole, the bushing having:
        an inner member having a head, a threaded shaft extending from the head, and including a through hole along an axis of the inner member, the through hole configured to receive an optical transmission line therein, the inner member inserted through the flange hole such that the head rests on the attachment flange first face;
        a sleeve having an inner diameter having a first end which is threaded and configured for mating engagement with the threaded shaft and a second end which includes a concave chamber configured to direct light into the optical transmission line, the sleeve threaded onto the shaft such that the attachment flange is clamped between the inner member and the sleeve and a second end of the sleeve is suspended over the LED; and
    an optical transmission line inserted into the inner member through hole.

2. The electronic system of claim 1 wherein the shaft includes one or more relief slits disposed around the circumference of the shaft.

* * * * *